Patented Nov. 10, 1925.

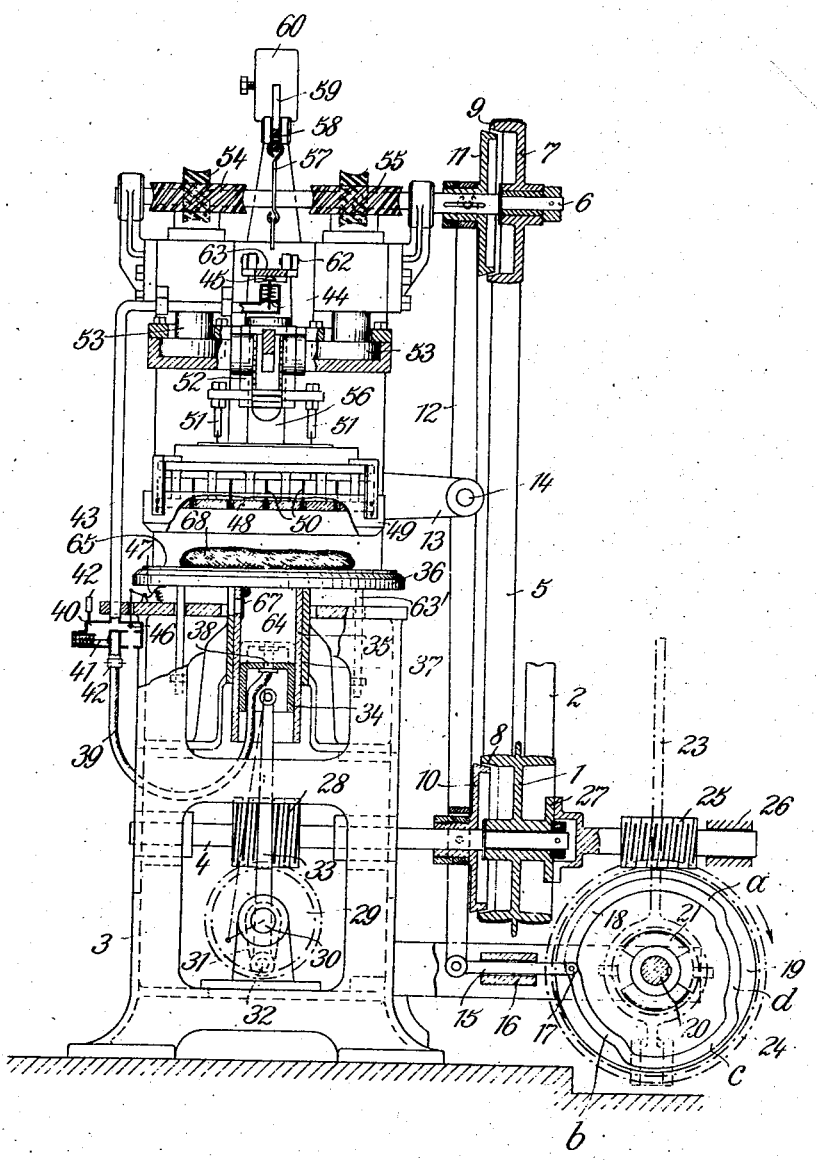

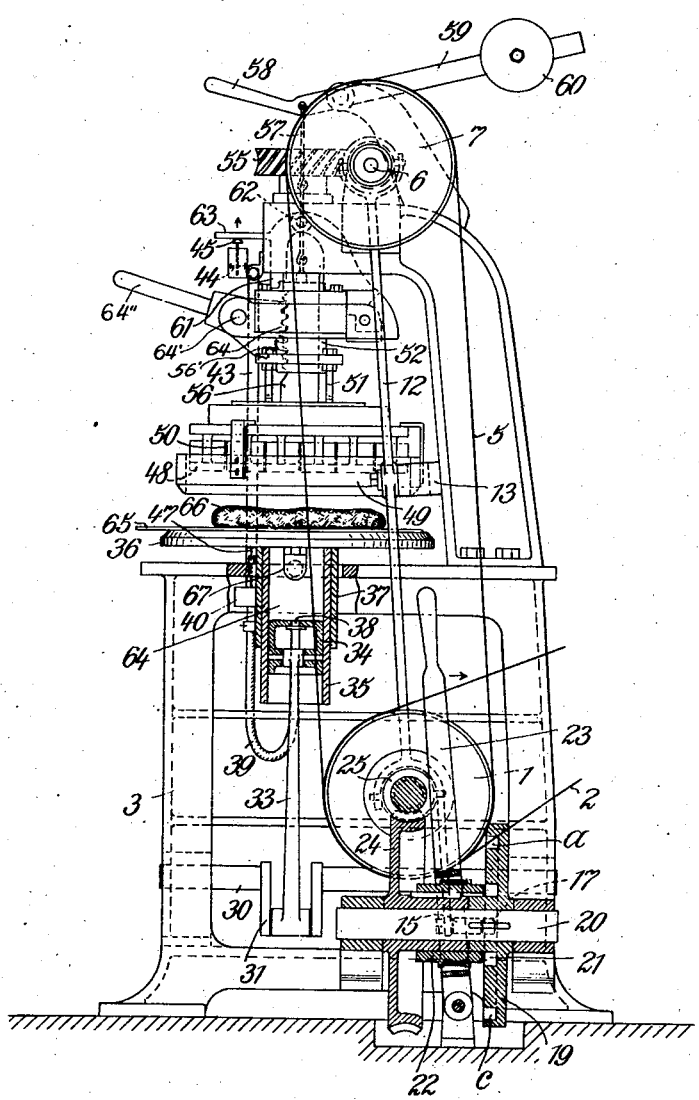

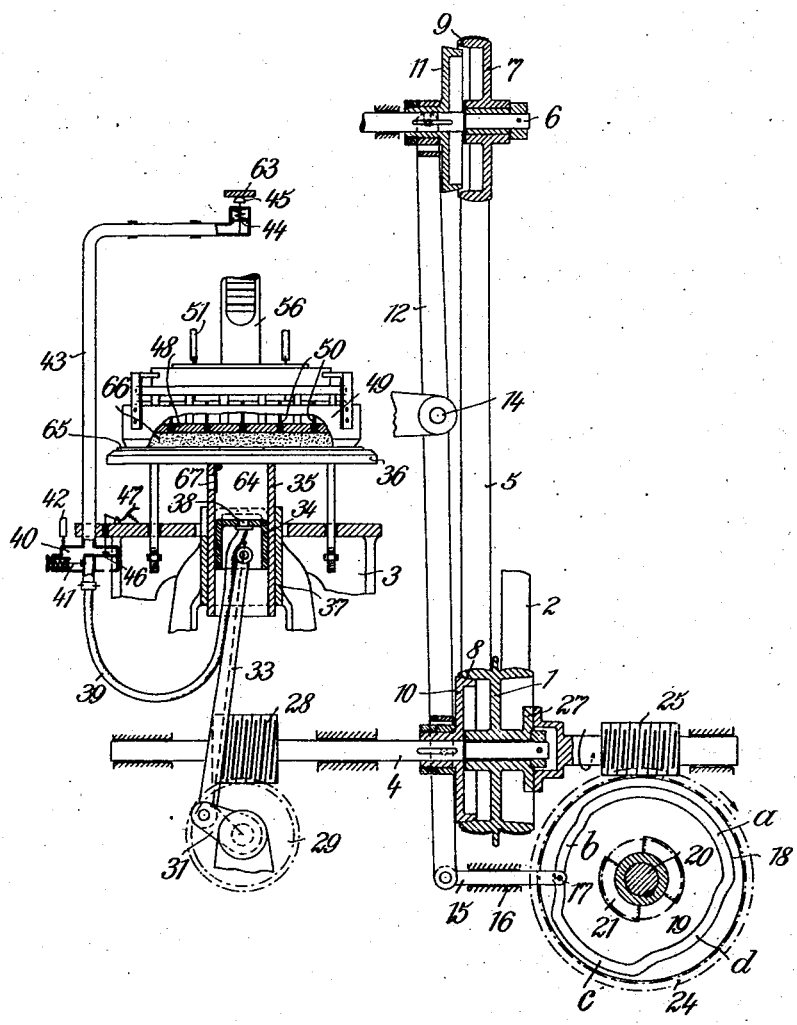

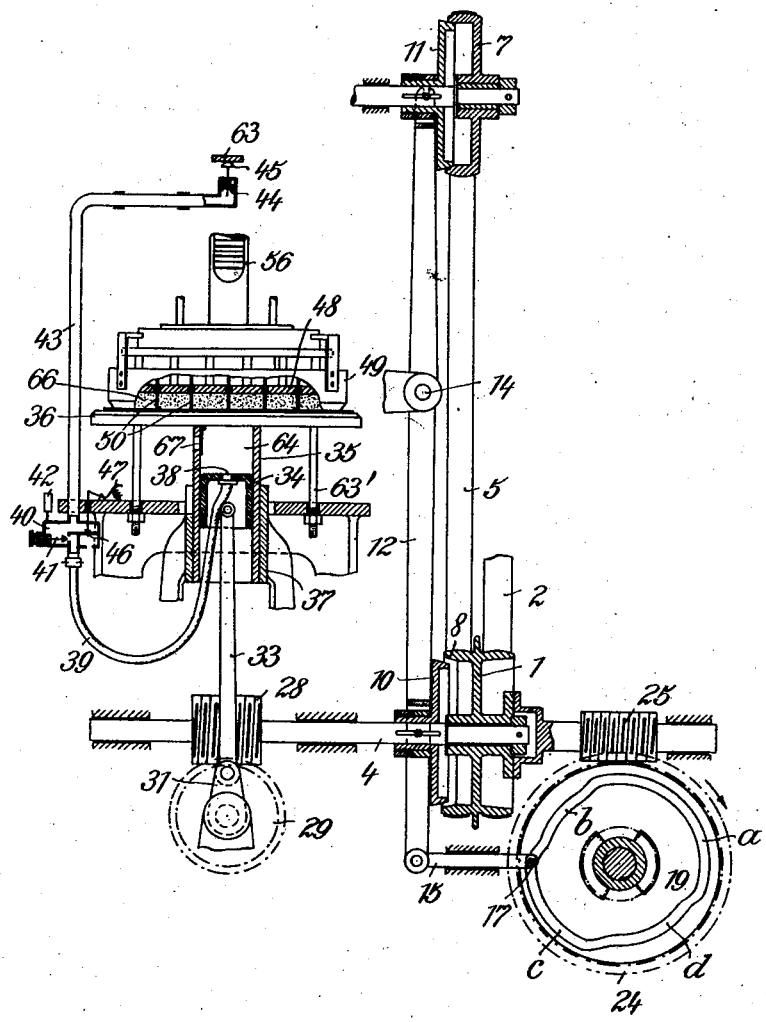

1,560,711

UNITED STATES PATENT OFFICE.

WILHELM AUGUST HEINRICH MOHR, OF HALLE-ON-THE-SALLE, GERMANY, ASSIGNOR TO HERM. BERTRAM HALLESCHE DAMPFBACKOFENFABRIK HALLESCHE MISCH- UND KNETMASCHINENFABRIK, OF HALLE, GERMANY.

DOUGH-DIVIDING MACHINE.

Application filed February 24, 1922. Serial No. 538,952.

*To all whom it may concern:*

Be it known that I, WILHELM AUGUST HEINRICH MOHR, a citizen of Germany, and a resident of Halle-on-the-Salle, Germany, have invented certain new and useful Improvements in Dough-Dividing Machines, of which the following is a specification.

My invention relates to improvements in dough dividing machines, and more particularly in machines of the type in which a batch of dough is pressed between two pressure members and separated into pieces by a cutting member. One of the objects of the improvements is to provide a machine in which the batch of dough is divided into pieces of uniform size. I have found that it is difficult in dough dividing machines to obtain pieces of uniform size for the reason that after being compressed between the pressure members the batch of dough does not lose its elasticity and tends to contract towards the middle. Therefore, if the pressure of the pressure members is relieved only a moment before the dough has been forced into the compartments of the cutting member, the batch is contracted from the margin toward its middle, so that the marginal pieces are reduced in size, while the pieces located near the middle are too large. In the operation of the apparatus now in use such relieving of the pressure can not be avoided. In case of hand operated apparatus the hand of the attendant acting on the pressure lever will accidentally yield, if the attendant throws the locking member coupling the pressing and dividing apparatus out of locking position, and in mechanically operated apparatus even a slight inaccuracy of the construction or a slight wear of the operating mechanism is sufficient to cause a reduction of the pressure. For this reason I provide elastic means for forcing the pressure members towards each other, and in the preferred form I interpose pneumatic means between the operating mechanism and the pressure members, the pressure fluid being adapted to maintain the pressure on the pressure members, until the force acting on the pressure producing means is relieved. In the preferred form of the machine the pneumatic pressure is produced by the operating mechanism of the apparatus, so that independent power producing or power storing means can be dispensed with. With this object in view I provide a crank mechanism in connection with a pneumatic cylinder and piston acting on the pressure members, which crank mechanism is adapted upon one half rotation of the crank to produce pressure within the pneumatic cylinder and upon the succeeding half rotation of the crank to relieve the pressure, the pressure members being moved for performing the dough pressing and dividing operation when the fluid pressure within the cylinder is produced, and said members being returned into initial position when the crank mechanism reduces the fluid pressure.

Other objects of the improvements will be explained in connection with the description of the apparatus. For the purpose of explaining the invention an example embodying the same has been shown in the accompanying drawings, in which the same reference characters have been used in all the views to indicate corresponding parts.

In said drawings,—

Fig. 1 is a front view of the machine partly in section,

Fig. 2 is a side view of Fig. 1 partly in section,

Fig. 3 is an elevation of the dough dividing and working parts and the driving mechanism thereof partly in section, showing the said parts in the positions after pressing the dough, and Fig. 4 is a similar view showing the said parts after dividing the dough.

In the example shown in the figures the mechanism is operated by a pulley 1 which is loosely mounted on a shaft 4 and has a driving belt 2 trained thereon. The pulley 1 is connected by a belt 5 with a pulley 7 which is loosely mounted on a shaft 6. The pulleys 1 and 7 are constructed in the form of clutch members 8 and 9 cooperating respectively with clutch members 10 and 11 which are longitudinally shiftable on the shafts 4 and 6, rotation of the members relatively to the shafts being prevented by feathers. The clutch members 10 and 11 are engaged by a lever 12 having a rocking support on a pivot bolt 14 mounted on a bracket 13 of the frame 3 of the machine. To the bottom end of the lever 12 a horizontal rod 15 is jointed which is longitudinally shiftable within a bearing 16 and carries at its end a roller 17 engaging in a cam groove 18 made in a cam disk 19. The disk 19 is loosely mounted on a short shaft 20 disposed at the side of the frame 3, and it is constructed to provide one member of a clutch the cooperating member 22 of which is adapted to be thrown into or out of coupling position by means of a rocking lever 23. The clutch member 22 is longitudinally shiftable on the hub of a gear wheel 24 which is in engagement with a worm 25, rotation of the clutch member 22 relatively to the gear wheel being prevented by a feather. One end of the shaft of the worm 25 is mounted in a bearing 26 and the opposite end is secured by screws to the hub 27 of the pulley 1.

To the shaft 4 a worm 28 is keyed which is in engagement with a gear wheel 29 secured to a shaft 30 mounted on the frame 3 and carrying a crank 31. To the crank pin 32 of the crank a connecting rod 33 is jointed the opposite end of which is jointed to a plunger 34 having reciprocating movement within a cylinder 35 secured to the lower pressure plate 36 and guided within a cylinder 37 secured to the frame 3. The plunger 34 is formed with an opening 38 connected by a flexible tube 39 with a valve casing 40, the tube 39 being normally closed by a spring pressed check valve 41 adapted to be set according to the pressure within the casing 40, which pressure is indicated by a manometer 42. At the opposite side of the valve 41 the casing 40 is connected with a pipe 43 provided at its end with a spring pressed piston 44 controlling an operating member 45. The casing 40 is equipped with a second valve 46 adapted to open the pipe 43 to the outer air and controlled by an operating lever 47 located in the path of the pressure plate 36.

The other parts of the machine are well known in dough dividing and working machines so that a brief description will be sufficient. The lower pressure plate 36 cooperates with an upper pressure plate 48 which is surrounded by a ring 49 projecting downwards beyond the bottom face of the upper plate. The pressure plate 48 is formed with slots permitting the passage of a dough dividing knife 50 therethrough, which knife is secured to rods 51 connected with a sleeve 52 adapted to receive circular or other gyratory movement from a shaft 6 through the intermediary of two worm gearings 54 and 55 and cams 53, 53. Within the sleeve 52 a spindle 56 is located which carries at its lower end the pressure plate 48, and which is connected at its upper end by a tension member such as a chain 57 with one arm 58 of a lever 59 carrying a weight 60 balancing the weight of the pressure plate 48, provided that a locking member 61 normally connecting the sleeve 52 and the spindle 56 is lifted from the position shown in Fig. 2 by rocking the same about the pivot 62. The locking member 61 is formed with an arm 63 bearing on the controlling member 45. The upward stroke of the lower pressure plate 36 is limited by rods 63' guided in the upper plate of the frame 3. The rod or spindle 56 is provided with rack teeth 56' in mesh with a toothed segment 64 journaled at 64' and having a handle 64" for actuating it. These parts (56', 64, 64', 64") have no function during the normal operation of the machine, but serve simply to shift the knives and the pressure-plate 48 having guides for the knives 50, whenever it is desired to expose these parts for easier cleaning, or to bring them back to the normal operative position after such cleaning.

For operating the machine the lever 23 shown in Fig. 2 is rocked to the right for throwing the clutch 21, 22 into coupling position and imparting rotary movement to the cam disk 19. In the position of the parts shown in Fig. 1 the roller 17 is about to leave the section $a$ of the cam groove 18 and to be engaged by the section $b$. Therefore the rod 15 is pulled to the right and the lever 12 is rocked into position for throwing the clutch 8, 10 into coupling position. Rotary movement is imparted to the shaft 4 and such rotary movement is transmitted through the worm gearing 28, 29 to the shaft 30, so that the crank 31 is moved in clock-wise direction from its lower position and upward and the connecting rod 33 forces the plunger 34 within the cylinder 35 upward and compresses the air confined within the chamber 64 provided between the plunger 34, the cylinder 35 and the pressure plate 36. When the plunger 34 is in the position shown in Fig. 1 in dotted lines the pressure within the chamber 64 is such that the pressure plate 36, the dough carrying plate 65 and the batch of dough 66 are moved upward. Thereby the dough is pressed apart between the pressure plates 36 and 65 and into the form shown in Fig. 3. Thereafter the plunger 34 is further lifted into the position shown in Fig. 3 in dotted lines, and the air within the chamber 64 is further compressed for increasing the pressure. Now the pressure within chamber 64 is such that the valve 41 which is controlled through the tube 39 and the opening 38 by the fluid pressure within the chamber 64 is unseated and the compressed air flows into the pipe 43. When the pressure of the air acts on the piston 44 provided at the end of the pipe 43 the piston and the pressure member 45 connected therewith are lifted, so that the arm 63 is forced upward and the locking member 61 is rocked about the pivot 62 and away from the spindle 56 carrying the pressure plate 48. Now the pressure plate 48 can yield to the increased pressure of the air within the chamber 64 so that the plate 36, 65 is further lifted and the batch of dough 66 is pressed into the compartments of the knife 50. The parts are now in the position shown in Fig. 4 in which the pressure plate 36 is in the highest position allowed by the rods 63 from which it does not in any way yield as long as there is high pressure within the chamber 64.

All the movements described herein are performed within a very short period of time. The dividing of the batch of dough immediately succeeds the pressing thereof so that even the slightest yielding of the pressure plate 36 before the dividing operation is impossible. Such yielding is also impossible for the reason that prior to dividing the pressure within the chamber 64 is at its maximum, which pressure even exceeds the pressure required for pressing the dough, because this pressure was already attained with the plunger in the position shown in Fig. 3 in dotted lines and the plunger has thereafter continued its inward movement. The amount of air escaping from the chamber 64 through the tube 39 is not such as to produce any material reduction of the pressure within the said chamber.

In the position shown in Fig. 4 the roller 17 is engaged by the section c of the cam groove 18. Therefore rod 15 is shifted to the left and the upper end of the lever 12 is rocked to the right so as to throw the clutch 8, 10 out of coupling position and to stop the movement of the shaft 4 and the crank mechanism 31, 32, 33, while the clutch 9, 11 is set in coupling position and rotary movement is imparted to the shaft 6. From the shaft 6 the rotary movement is transmitted through the worm gearings 54 and 55 and the cams 53 to the sleeve 52 performing together with the pressure plate 48, the dividing knife 50 and the ring 49 gyratory movement for working the pieces of dough. By the working operation the pieces of dough grow, and the pressure plate 48 can yield accordingly by being balanced by the weight 60. At the end of the working operation the roller 17 is engaged by the section d of the cam groove 18, whereby the shaft 6 is again stopped and rotary movement is imparted to the shaft 4. Upon such rotary movement of the shaft 4 the crank arm 31 is turned from its upward position into its downward position, and the connecting rod 33 pulls the plunger 34 downward so as to reduce the pressure within the chamber 64 and to move the pressure plate 36, the cylinder 35, the dough carrying plate 65 and the pieces of dough placed thereon downward. Slightly before arriving in the lowermost position the plate 36 engages the lever 47 controlling the valve 46, which is opened and permits the compressed air to escape from the pipe 43. The amount of compressed air which is withdrawn from the contents of the chamber 64 by flowing into the conduits 39 and 43 is replaced by a check valve 67 disposed within the cylinder 35.

The length of the section a of the cam groove is such that the pressure plate 36 is held in its lowermost or inoperative position a length of time which is sufficient for removing the plate 65 with the divided and worked balls of dough and putting on the plate 36 a new plate and another batch of dough.

An important feature of my invention resides in the means for automatically controlling the operation of the dividing operation by breaking the connection between the sleeve 52 and the spindle 56, whereby the upper pressure plate 48 and the knife 50 can be moved relatively to each other for dividing the batch of dough. By providing such automatic means operation by hand can be dispensed with, and the pressing and dividing operations are performed in direct succession and with high speed. This results in a higher accuracy in dividing the dough, because the compressed dough has no time to contract towards the middle, and furthermore the efficiency of the apparatus is increased by reducing the time required for pressing and dividing the dough.

By controlling the crank mechanism from the main shaft of the machine the pressing and dividing operations and the return movement of the parts are made automatic, which likewise results in high velocity and accuracy of the operation.

While in describing the invention reference has been made to a particular example embodying the same I wish it to be understood that my invention is not limited to the construction shown in the drawings, and that various changes may be made in the general arrangement of the apparatus and the construction of its parts without departing from the invention.

I claim:

1. In a dough operating machine, the combination, with a pair of pressure members adapted to hold a batch of dough between the same, and dough dividing means, of a crank mechanism, a pneumatic cylinder and plunger connected respectively to one of said plates and the crank mechanism, and means to operate the crank mechanism.

2. In a dough operating machine, the combination, with a pair of pressure members adapted to hold a batch of dough between the same, and dough dividing means, of two movable co-operating elements, viz: a pneumatic cylinder and a plunger, one of said elements being connected to one of said pressure members, and operating mechanism connected with the other of said elements.

3. In a dough operating machine, the combination, with a pair of pressure members adapted to hold a batch of dough between the same, and dough dividing means, of two movable co-operating elements, viz: a pneumatic cylinder and a plunger, one of said elements being connected to one of said pressure members, and operating mechanism connected with the other of said elements, said operating mechanism being adapted alternately to produce pneumatic pressure within the cylinder and to relieve the same.

4. In a dough operating machine, the combination, with a pair of pressure members adapted to hold a batch of dough between the same, and dough dividing means, of elastic means for forcing one of said members against the other one, means for locking said dividing means and the member which is not directly acted upon by the elastic means relatively to each other, and means controlled by said elastic means for throwing said locking means in non-locking position.

5. In a dough operating machine, the combination, with a pair of pressure members adapted to hold a batch of dough between the same, and dough dividing means, of pneumatic means for forcing one of said members against the other one, means for locking said dividing means and the member which is not directly acted upon by the pneumatic means relatively to each other, and means controlled by said pneumatic means for throwing said locking means in non-locking position.

6. In a dough operating machine, the combination, with a pair of pressure members adapted to compress a batch of dough between the same, dough dividing means, and locking means therefor, of operating means, a pneumatic cylinder and piston intermediate said operating means and one of said pressure members, and means controlled by the pressure within said cylinder to throw said locking means out of locking position.

7. In a dough operating machine, the combination, with a pair of pressure members adapted to compress a batch of dough between the same, dough dividing means, and locking means therefor, of operating means, a pneumatic cylinder and piston intermediate said operating means and one of said pressure members, means controlled by the pressure within said cylinder to throw said locking means out of locking position, and automatic means to cause said means controlled by the pressure within the cylinder to return into initial position.

8. In a dough operating machine, the combination, with a pair of pressure members adapted to compress a batch of dough between the same, dough dividing means, and locking means therefor, of operating means, a pneumatic cylinder and piston intermediate said operating means and one of said pressure members, means controlled by the pressure within said cylinder to throw said locking means out of locking position, and automatic means controlled by the pressure member directly acted upon by said cylinder and piston to cause said means controlled by the pressure within the cylinder to return into initial position.

9. In a dough operating machine, the combination, with a pair of pressure members adapted to hold a batch of dough between the same, of elastic means for forcing said pressure members against each other, and automatic means engaged by one of said members during its movement controlling the operation of said elastic means.

10. In a dough operating machine, the combination, with a pair of pressure members adapted to hold a batch of dough between the same, and dough dividing means, of a crank mechanism, a pneumatic cylinder and plunger connected respectively to one of said plates and the crank mechanism, means to operate the crank mechanism, and an automatically operated cam disk controlling the operation of said crank mechanism operating means.

11. In a dough dividing and working machine, the combination, with a pair of pressure members adapted to receive a batch of dough between the same, dough dividing means, and dough working means, of operating mechanism for said pressure members, dough dividing means, and dough working means, said operating mechanism including a movable pressure-exerting member and an elastic connection transmitting pressure with a gradually increasing force to said pressure members, and an automatically operated cam controlling said mechanism.

12. In a dough dividing and working machine, the combination, with a pair of pressure members adapted to receive a batch of dough between the same, dough dividing means, and dough working means, of operating mechanism for said pressure members, dough dividing means, and dough working means, said operating mechanism including a movable pressure-exerting member and an elastic connection transmitting pressure with a gradually increasing force to said pressure members, and an automatically operated cam controlling said mechanism, said cam having an operating section constructed for holding said members in operative position a length of time sufficient for removing the worked dough and putting in a new batch of dough.

In testimony whereof I hereunto affix my signature.

WILHELM AUGUST HEINRICH MOHR.